United States Patent [19]

Tsuchimoto

[11] Patent Number: 4,632,590
[45] Date of Patent: Dec. 30, 1986

[54] CONNECTING STRUCTURE FOR CONNECTING A CERAMIC SHAFT TO A METALLIC SHAFT

[75] Inventor: Yoshihiro Tsuchimoto, Musashino, Japan

[73] Assignee: Asahi Glass Company Ltd., Tokyo, Japan

[21] Appl. No.: 659,451

[22] Filed: Oct. 10, 1984

[51] Int. Cl.[4] .............. F16B 9/00; F16B 7/02
[52] U.S. Cl. ................ 403/30; 403/179; 403/261; 403/336; 403/360
[58] Field of Search .......... 403/360, 261, 262, 336, 403/326, 361, 373, 365, 337, 376, 259, 260, 179, 28, 29, 30

[56] References Cited

U.S. PATENT DOCUMENTS

| 2,516,472 | 7/1950 | MacKeage, Jr. | 403/361 X |
|---|---|---|---|
| 3,638,974 | 2/1972 | Stratienko | |
| 3,652,110 | 3/1972 | Manton | 403/336 X |
| 4,134,699 | 1/1979 | Schäfer et al. | 403/336 X |
| 4,167,351 | 9/1979 | Bindin | 403/179 X |
| 4,281,941 | 8/1981 | Rottenkolber | 403/179 X |
| 4,396,310 | 8/1983 | Müllenberg | 403/373 X |

FOREIGN PATENT DOCUMENTS

| 1426771 | 11/1968 | Fed. Rep. of Germany . | |
| 1943790 | 3/1970 | Fed. Rep. of Germany . | |
| 2024436 | 12/1971 | Fed. Rep. of Germany . | |
| 54-53726 | 4/1979 | Japan | 415/9 |
| 417233 | 1/1967 | Switzerland . | |
| 798142 | 7/1958 | United Kingdom . | |
| 913812 | 12/1962 | United Kingdom . | |
| 1140601 | 1/1969 | United Kingdom . | |

Primary Examiner—Cornelius J. Husar
Assistant Examiner—Peter M. Cuomo
Attorney, Agent, or Firm—Oblon, Fisher, Spivak, McClelland & Maier

[57] ABSTRACT

A connecting structure for connecting a ceramic shaft to a metallic shaft comprises an arc body having a tapered portion in cross section, the arc body being fitted around a ceramic shaft, a member inserted by the ceramic shaft and placed adjacent the arc body at its one side, a metallic shaft placed adjacent the arc body at its other side, at least one of the member inserted by the ceramic shaft and the metallic shaft being in contact with the tapered portion and a fastening means for fastening the member and the metallic shaft to clamp the arc body.

6 Claims, 4 Drawing Figures

CONNECTING STRUCTURE FOR CONNECTING A CERAMIC SHAFT TO A METALLIC SHAFT

BACKGROUND OF THE INVENTION

The present invention relates to a connecting structure for connecting a ceramic shaft to a metallic shaft. More particularly, it relates to a connecting structure for connecting a ceramic shaft to a metallic shaft, which is suitable for driving the ceramic shaft attached with a ceramic butterfly valve body of a butterfly valve used at a high temperature.

A compressed air having a high temperature such as 1200° C. and a high pressure such as 3.5 kg/cm$^2$ (guage pressure) is blown into tuyeres of a blast furnace for manufacturing iron at a high velocity such as 120 m/s and the blast furnace is provided with about twenty tuyeres. In such a blast furnace, it is desirable to separately control a flow rate of air of high temperature, pressure and velocity for each tuyere with use of valves.

To satisfy the above-described purpose, an attempt to use a valve having a metallic valve body was made. However, it could not be in practical use because the metallic valve body is poor in heat resistance. Another attempt of cooling a metallic valve body with water failed to put it to practical use due to large heat loss in the valve body. On the other hand, it can be considered that ceramics having excellent heat resistance are used to form a valve body and a driving shaft in one piece. It is, however, impossible to manufacture such a complicated product in shape with ceramics at the present technique. In view of difficulty in manufacturing a desirable valve, there are proposals that a valve body including a shaft is made of ceramics; a driving shaft is made of metal and both the shafts are connected together. As one of the proposals, there is known a method of connecting a ceramic shaft to a metallic shaft with an adhesive. This method has, however, disadvantages that an expensive and special adhesive is required and a pre-treatment step used is complicated. There is another method of subjecting a metallic shaft to shrinkage-fitting onto a ceramic shaft. However, the method requires a highly accurate and delicate technique to adjust the quantity of shrinkage and the method sometimes causes an extensive change in connecting strength due to variation in temperature. There is also known another method such that a recess (or a projection) for a pin or a key in a ceramic shaft is formed to engage it with an annular part having the corresponding shape of a metallic shaft. With this method, the ceramic shaft has to be finished into a complicated shape and in addition, concentration of stress is produced at the recess (or the projection) of the ceramic shaft when used thereby impairing reliability. Further, a gap is produced at the connecting part due to change in temperature to result in an excessive stress.

In the construction for connecting a ceramic shaft to a metallic shaft as above-mentioned, a rotational torque from the metallic shaft must be certainly and powerfully transmitted to the ceramic shaft. Since the valve body is exposed to an air flow having a high velocity, there easily takes place vibration. The valve should, nevertheless, have the connecting structure without causing looseness and with a high rigidity. Further, it is desirable that the connecting structure is easily assembled, disassembled or can permit replacement of parts.

There has not been practically used a control valve for a high temperature, high pressure fluid, since a connecting structure satisfying the problems as abovementioned has not be proposed.

SUMMARY

It is an object of the present invention to provide a novel connecting structure for connecting a ceramic shaft to a metallic shaft to solve the problems described above.

The present invention provides a connecting device for connecting a ceramic shaft to a metallic shaft, comprising an arc body having a tapered portion in cross section, the arc body being fitted around a ceramic shaft, a member inserted by the ceramic shaft and placed adjacent the arc body at its one side, a metallic shaft placed adjacent the arc body at its other side, at least one of the member inserted by said ceramic shaft and the metallic shaft being in contact with the tapered portion of the arc body and a fastening means for fastening the member and the metallic shaft to clamp the arc body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An embodiment of the present invention will be described with reference to the drawings.

Figure 1:
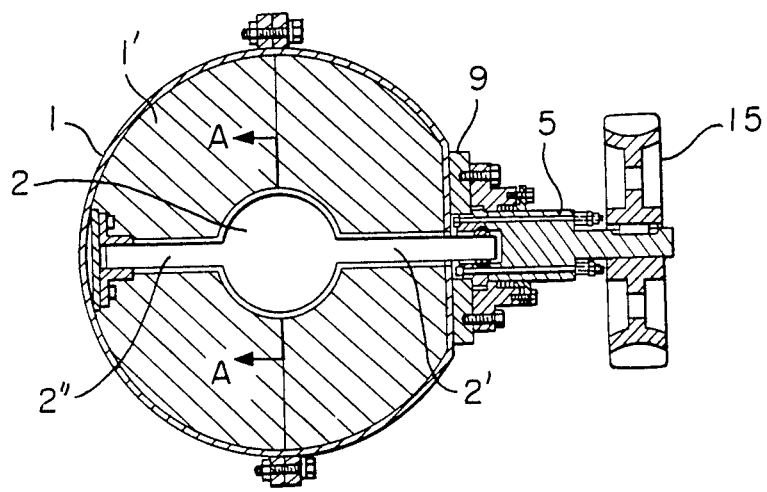
FIG. 1 is a longitudinal cross-sectional view of an embodiment of a butterfly valve having a connecting structure of the present invention.
Figure 2:
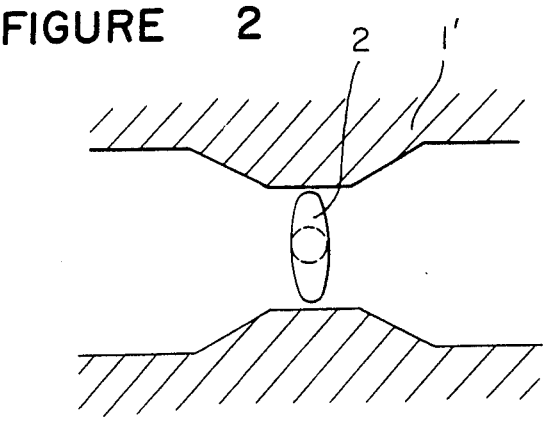
FIG. 2 is a cross-sectional view taken along the line A—A in FIG. 1.

FIG. 1 shows an embodiment of the butterfly valve having connecting structure of the present invention. A ceramic valve body 2 is arranged at the central portion of a casing 1. A refractory heat-insulating layer 1' in a hollow cylindrical shape, made of a material such as castable refractory is provided between the casing 1 and valve body 2. As apparent from FIG. 1 in consideration of FIG. 2, the valve body 2 has a disc-like central part and cylindrical shafts 2', 2'' extending from both ends of the disc-like part. The disc-like part and both the shafts are of ceramics having excellent heat resistance and corrosion resistance at a high temperature, and preferably, they are formed in one piece by sintering. Ceramics such as silicon carbide, silicon nitride, SIALON (silicon, aluminum, oxynitride), zirconia, alumina, mullite, zirconium boride is preferably used because of its having a high flexural strength or high tenacity.

Figure 3:
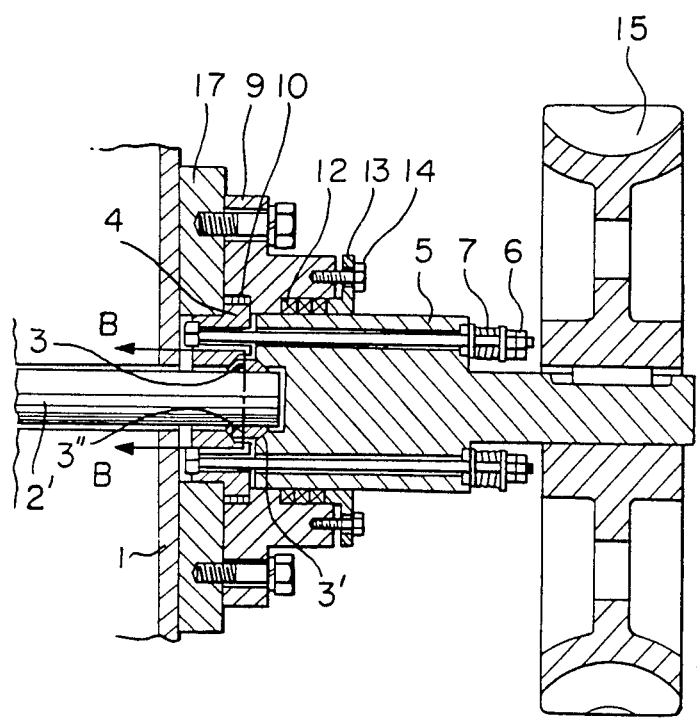
FIG. 3 is an enlarged view of an important part in FIG. 1.
Figure 4:
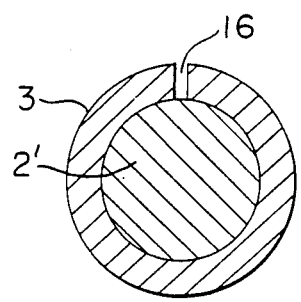
FIG. 4 is a cross-sectional view of an important part taken along the line B—B in FIG. 3.

The ceramic shaft 2' extending out of the casing 1 is surrounded by an arc body 3 made of metal, preferably, of metal having heat resistance, and having an inner circumferential curvature which corresponds to that of the ceramic shaft 2' as shown in FIGS. 3 and 4. In the embodiment shown in FIG. 4, the ceramic shaft 2' is surrounded by a single arc body 3 having a single slit 16. However, a plurality of arc bodies divided into plural pieces along the outer circumference of the ceramic shaft 2 may be used. In this case, a plurality of slits are formed between the arc bodies. Selection of number of the arc bodies is determined in consideration of easiness of manufacturing arc body, connecting strength required and stress admissible to the ceramic shaft.

The cross-section of the arc body 3 constitutes trapezoid in which the inner arc side is given as a longer bottom and tapered portions 3', 3" at both sides respectvely have an angle of 45°. A metallic ring 4 and a metallic shaft 5 are arranged at both sides of the arc body 3 and the metallic ring 4 and the metallic shaft 5 are fastened at plural positions by bolts 6 tnrough bellevile springs 7, the bolts 6 extending in a plurality of through holes formed in the metallic ring 4 and the metallic shaft 5. The arc body 3 has tapered portions 3' and 3" at its both sides. A tapered portion is formed in the metallic ring 4 to correspond the tapered portion 3" and a tapered portion is formed in the metallic shaft 5 to correspond to the tapered portion 3' of the arc body 3. A rotary-shaft supporter 9 is screw-engaged with a fitting table 17 which is firmly connected to the casing 1. A sliding bearing 10 is arranged between the rotary-shaft supporter 9 and the metallic ring 4 and packings 12 are arranged between the rotary-shaft supporter 9 and the metallic shaft 5 respectively. A packing gland 13 for preventing shift of the packings 12 is attached to the rotary-shaft supporter 9 with screws 14. Thus, the packing gland 13 and the rotary-shaft supporter 9 are secured to the casing 1 through the fitting table 17 to constitute a fixed part. On the other hand, the metallic shaft 5 and metallic ring 4 are secured to the ceramic shaft 2' through the arc body 3 to constitute a rotating part. Provision of the bearing 10 and the packings 12 assures a smooth rotating movement of the rotating part and presence of the packings 12 prevents a high pressure fluid from leaking out the system. A worm wheel 15 is connected to the metallic shaft in a suitable manner so that a rotating movement transmitted to the worm wheel 15 by a worm (not shown) is transmitted to the metallic shaft 5, hence the ceramic valve body 2.

The metallic shaft 5 and the metallic ring 4 are fastened by the bolts 6 with a strong force against elastic force of the belleville springs 7 so that they come close to one another. A fastening means for fastening both elements may be a suitable one other than the bolts and the belleville springs 7 can be replaced by coil springs or another elastic means. It is, however, desirable to use an elastic fastening means which imparts a force approaching an appliable strength of the fastening means such as bolt. Accordingly, an elastic means constituted by stacking a plurality of belleville springs 7 as shown in FIG. 3 is preferably used.

When a strong force acts on the metallic ring 4 and the metallic shaft 5 so that they mutually come closely, the arc body 3 is strongly radially compressed due to a wedging function because the tapered portions 3', 3" are respectively in contact with the metallic shaft 5 and the metallic ring 4. The ceramic shaft 2' is surrounded by one or more arc bodies 3, hence there are one or more slits around the ceramic shaft 2' whereby a radial pressing force is transmitted to the ceramic shaft 2' without substantial attenuation. Namely, the metallic shaft 4 is strongly connected to the ceramic shaft 2' by providing a structure such that a strong contact pressure is given to the ceramic shaft 2' by the arc body 3 and a strong contact pressure is given to the arc body 3 by the metallic shaft 4.

The contact pressure can be increased to be near the compressive strength of the ceramic shaft. However, when the contact pressure is excessively large, there causes breakage of the ceramic shaft. Accordingly, the contact pressure must be determined at the optimum value as desired. In accordance with the connecting structure of the present invention, a desired contact pressure can be easily determined by specifying the demension, number and allowance of compression of the elastic body such as belleville springs since relation between the fastening force with use of the fastening means and the contact pressure acting on the ceramic shaft is easily obtained by dynamic analysis.

In the connecting structure of the present invention, even though there is a difference in expansion due to change in temperature and difference in the thermal expansion coefficient of a different kind of material, change in contact pressure is negligible and a desired, fixed contact pressure can be maintained. The description will be made in more detail. Assuming that relative expansion results between the diameters of the ceramic shaft 2' and the metallic shaft 5 due to the cause as described above. As the ceramic shaft expands, the inner diameter of the arc body 3 increases without substantial resistance because of presence of the slit. Then, the outer diameter of the arc body tends to increase. At the moment, there results slippage at contacting portions between the tapered portion 3' and metallic shaft 5 and between the tapered portion 3" and the metallic ring 4 whereby the metallic shaft 5 and the metallic ring 4 move to separate from each other. Accordingly, there is no restriction in expansion of the arc body 3. It is desirable for generation of smooth slippage that inclination of the tapered portion to the axial line is greater than frictional angle. Preferably, such inclination angle is in the range from 30° to 60°. The belleville springs 7 are compressed by the movement of the metallic shaft 5 and the metallic ring 4. The quantity of movement is obtained by the product of the quantity of relative expansion of the ceramic shaft to the metallic shaft and the cotangent of the above mentioned angle. Since the former takes a small value, the quantity of movement also takes a small value and a compression stress caused by the belleville springs 7 does not substantially change, on account of which the contact pressure does not substantially change. Similarly, relative shrinkage of the diameter of the ceramic shaft 2' to the diameter of the metallic shaft 5 does not cause substantial change in contact pressure.

Thus, the ceramic shaft 2', the arc body 3, the metallic ring 4 and the metallic shaft 5 are contacted with each other with a strong contact pressure and accordingly, a strong frictional force acts on them to thereby accomplish a strong, integral connection.

The transmissible torque of the connecting structure according to the present invention was compared with that of the conventional connecting structure having a key groove.

An assembly having the following connecting structure was fabricated in which the diameter of a ceramic shaft made of silicon carbide was 40 mm, the angles of the tapered portions 3', 3" and the contacting surfaces of the metallic ring 4 and the metallic shaft 5 were respectively 45° with respect to the axial line and the total value of the compression stress imparted by the bellevile springs was 15 tons. It is possible to select material of the arc body so that a coefficient of friction between the ceramic shaft and the arc body is about 0.5.

In this case, the transmissible torque is about 125 kgf.m. Then, when the length of the longer bottom of the arc body 3 is assumed to be 32 mm, the contact pressure between the ceramic shaft and the arc body is about 15 kgf/mm², which is sufficiently safe compared with breaking stress of the ceramic shaft. When the torque of 125 kgf.m is applied to the connecting structure, torsional stress in the ceramic shaft is about 10 kgf/mm², which is within the limit value of safe working load.

On the other hand, a ceramic shaft having the same material and the same diameter was prepared in which a key groove having a depth of 4.5 mm, a width of 10 mm and a curvature at corners of the groove of 0.6 mm R was formed in parallel to the axial line. The ceramic shaft was connected to a metallic shaft by key engagement. In this case, the stress concentration coefficient was 2-5 and accordingly, the transmissible torque was about 25-60 kgf.m.

In this embodiment, the metallic ring 4 is formed in symmetric with respect to the revolution center whereby manufacture and fitting of it can be easy. However, the metallic ring 4 can be replaced by an element inserted by the ceramic shaft, where the term of insertion means not only that the entire circumference of the ceramic shaft is surrounded, but also that it is surrounded in the form of a letter of U or C.

In view of a cross section of the arc body, a tapered portion may be formed at either side. However, it is desirable that tapered portions are formed at both sides to obtain a strong contact pressure. Further, in the embodiment, the tapered portions are provided over the entire portion of thickness extending from the inner circumference to the outer circumference of the arc body to reduce contact stress imparted to the tapered portions. However, the tapered portions may be formed at a part of the portion of thickness. The contacting surface of the arc body and the contacting surface corresponding to the tapered portion 3' or 3'' of the ceramic shaft or the metallic shaft may be desired shapes even though it is preferable to have a tapered form.

As described above, the contacting structure of the present invention has many advantages that it is unnecessary to employ a pre-treating step and a highly delicate technique and the ceramic shaft is of a simple structure without recesses and projections and transmits a rotational force from the metallic shaft certainly and strongly. Further, a strong connection between the ceramic shaft and the metallic shaft increases rigidity of the connecting structure and prevents looseness in it. Assembly, disassembling or replacement of parts in the connecting structure can be easy since structural elements are connected by fastening means such as bolts.

Thus, the connecting structure according to the present invention is preferably used to drive the ceramic shaft of a butterfly valve at a high temperature. However, it can be applied to other devices having a ceramic shaft and a metallic shaft.

I claim:

1. In a connecting structure between a metallic shaft and a ceramic chaft, connecting means comprising:
    at least one arc body fixed to said ceramic shaft about at least a portion of the circumference of said ceramic shaft, both ends of said arc body in a direction of an axis of said ceramic shaft having a first taper with a sense such that an axial width of said arc body increases toward said ceramic shaft;
    a metallic ring having at an axial end thereof a second taper shaped to mate with said first tapers, said ring being fitted on said ceramic shaft with said second taper engaging one of said first tapers with surface contact;
    a metallic shaft having at one end thereof a third taper shaped to mate with said first tapers, said metallic shaft being positioned coaxially with said ceramic shaft and with said third taper engaging the other of said first tapers; and
    spring means for elastically pressing said metallic shaft and said ring towards one another with a predetermined spring force, whereby said ceramic shaft is clamped with a predetermined force which is a function of said spring force.

2. The connecting structure of claim 1 wherein said at least one arc body extends less than 360° about said circumference of said ceramic shaft so as to define a slit.

3. The connecting structure of claim 1 wherein said spring means comprise:
    at least one bolt extending extending between said ring and said metallic shaft;
    nut means on each said bolt; and
    a spring mounted on each said bolt between said metallic shaft and said nuts means.

4. The connecting structure of claim 3 wherein said spring comprises at least one belleville spring.

5. The connecting structure of claim 3 wherein said spring is fully compressed.

6. The connecting structure of claim 1 wherein said arc body, ring and metallic shaft are sized such that said ring and metallic shaft do not contact one another.

* * * * *